(No Model.) 2 Sheets—Sheet 1.
E. T. GREENFIELD.
MACHINE FOR MAKING PAPER TUBING.
No. 461,676. Patented Oct. 20, 1891.
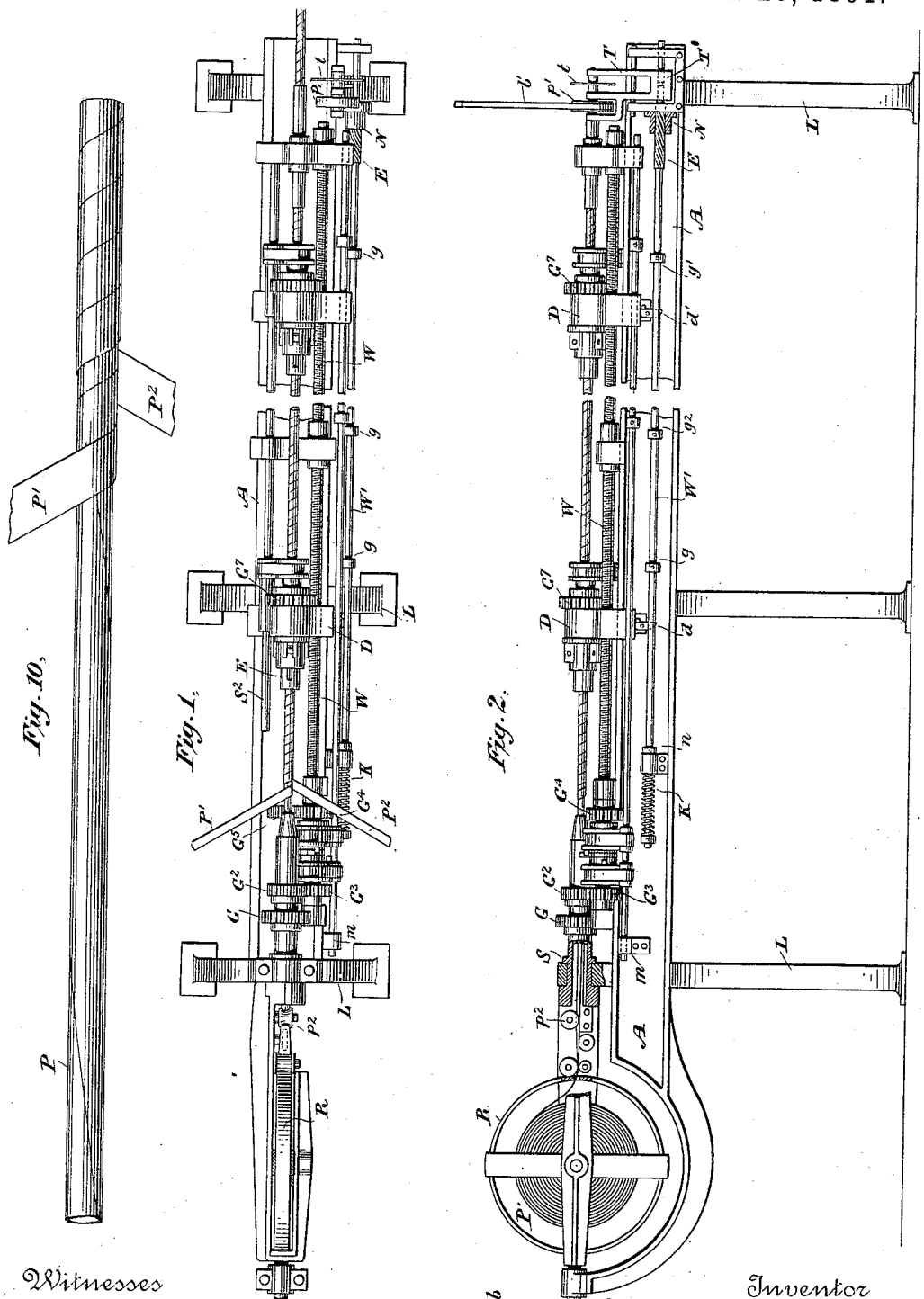
Witnesses
Geo. W. Breck
C. E. Ashley
Inventor
Edwin T. Greenfield
By his Attorney
Charles J. Kintner

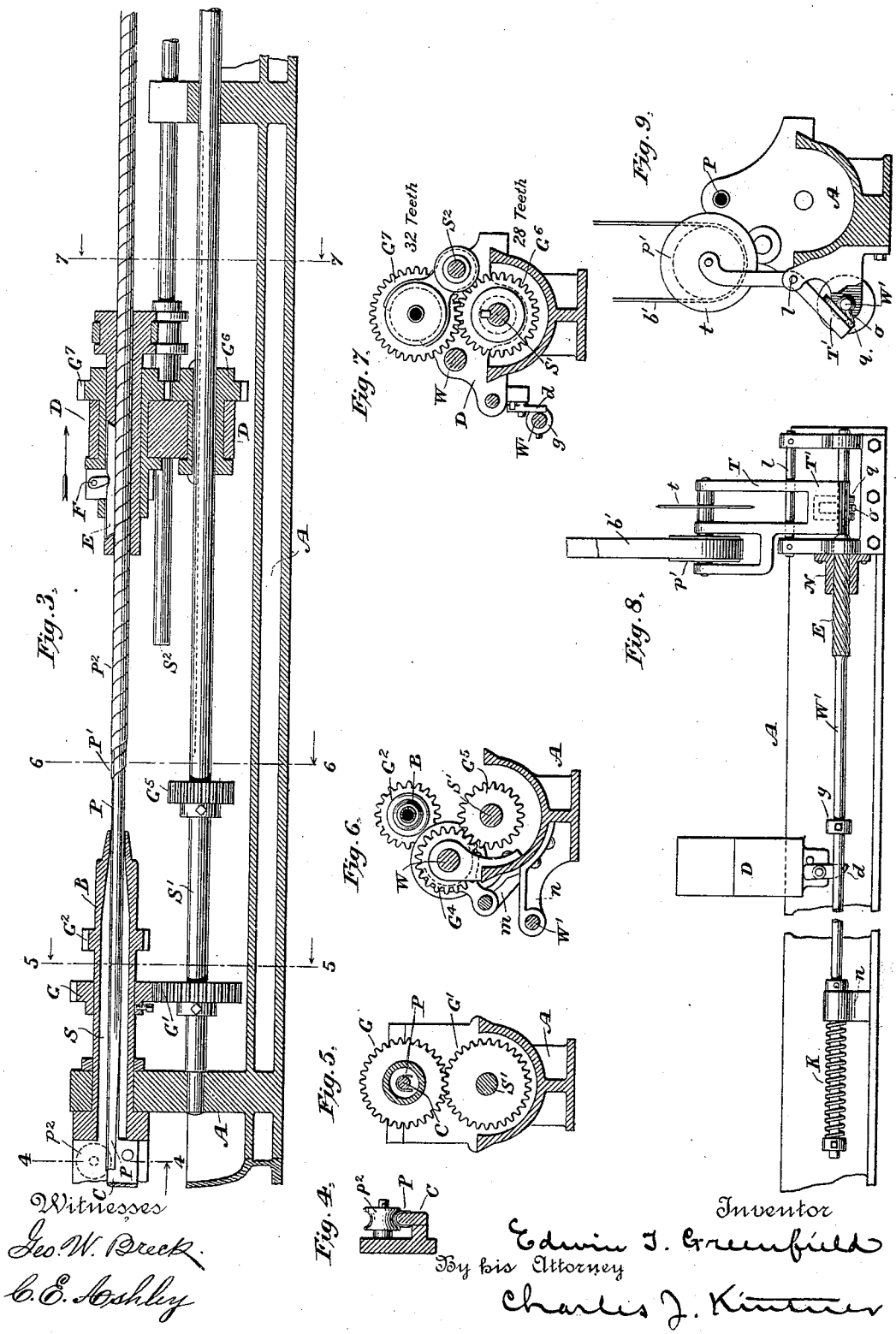

UNITED STATES PATENT OFFICE.

EDWIN T. GREENFIELD, OF NEW YORK, N. Y., ASSIGNOR TO THE INTERIOR CONDUIT AND INSULATION COMPANY, OF SAME PLACE.

MACHINE FOR MAKING PAPER TUBING.

SPECIFICATION forming part of Letters Patent No. 461,676, dated October 20, 1891.

Application filed January 16, 1891. Serial No. 377,957. (No model.)

*To all whom it may concern:*

Be it known that I, EDWIN T. GREENFIELD, a citizen of the United States, residing at New York, county of New York, and State of New York, have made a new and useful invention in Machines for Making Paper Tubing, of which the following specification is a full and exact description.

My invention is directed particularly to improvements upon a tube-making machine invented by Harmer Denney and disclosed in a patent granted to him on the 20th day of January, 1891, bearing number 444,950.

The mechanism disclosed in the aforesaid patent for making pipe or tubing from strips of paper consists of the following elements: first, a rotary shaft driven by a pulley, said shaft carrying a paper reel and a former, together with a throat adapted to give to a strip of paper drawn from said reel a cylindrical form in the nature of a continuous core for the pipe as constructed; second, clutching mechanism geared to the aforesaid shaft and adapted to clutch the formed tube or pipe successively and draw it forward as it is completed; third, a pair of paper-reels provided with strips of paper adapted to be wound successively around the aforesaid core as the completed tube is rotated and drawn forward by the clutching mechanism, and, fourth, a circular saw mechanically connected to the clutching mechanism through intermediate devices, whereby the tube as completed may be cut into pieces of a given length, said saw being driven by a pulley belted to the same shaft which drives the first-named pulley.

I have disclosed in the present application only so much of the above-named apparatus as may be necessary to give a full, clear, and exact understanding of my improvements. Said improvements have for their objects, first, the adaptation of the aforesaid apparatus to the production of a twisted cylindrical core, thereby giving to the core a more perfect and symmetrical form and also giving to it increased strength; second, the arrangement of the cutting apparatus in such a manner that the pipe or tubing may be cut into pieces of any desired length. I accomplish these objects by the adaptation and arrangement of mechanism hereinafter described, but particularly pointed out in the claims which follow this specification.

My invention will be fully understood by referring to the accompanying drawings, in which—

Figure 1 illustrates a plan view of a tube-making machine constructed in accordance with the description of the machine disclosed in the patent to Denney above referred to and embodying my improvements. Fig. 2 is a side elevational view of the same. Fig. 3 is a longitudinal sectional elevational view of the entire apparatus. Figs. 4, 5, 6, and 7 are cross-sectional views of Fig. 3, taken on lines 4 4, 5 5, 6 6, and 7 7. Fig. 8 is an enlarged elevational view of the saw with my improved attachments. Fig. 9 is a cross-sectional view of Fig. 8, embodying also my improved attachments. Fig. 10 is an elevational view of the paper tube, showing the twisted form of the core.

Referring now to the drawings in detail, A represents the base or frame of the machine, supported by standards or legs L L L, secured to the floor in the usual manner.

S represents a hollow shaft journaled in the frame, as shown in Figs. 2 and 3, and provided at its inner end with a hollow former B and an additional former C, adapted to give to the strip of paper P as it passes from the reel R a tubular conformation in the nature of a core, as clearly shown in Fig. 3, a grooved roller $p^2$ aiding in this conformation. The shaft S also carries the paper-reel, as clearly shown in Figs. 1 and 2, and is provided at its outer end with a pulley $p$, over which passes a belt $b$, connected to a source of power. (Not shown.) The inner end of the shaft S has secured to it a gear-wheel G, which meshes with a second gear-wheel G', carried by a second shaft S', which shaft in turn is geared through additional gear-wheels $G^3$ and $G^5$ with clutching devices D and a worm-shaft W, said clutching devices having clutch-blocks E and toggle-levers F, adapted to clutch the completed tube and draw it continuously forward as the clutches are connected and disconnected by operating mechanism located at each end of the worm-shaft W and adapted to connect said shaft with the gear-wheel G³ as the clutch mechanism oscillates back and forth.

The successive operation of the clutches is effected through the right and left handed worm W and through the agency of connecting and disconnecting mechanism illustrated in Fig. 1, the general operation of this portion of the apparatus being identically the same as that of the apparatus disclosed in the aforesaid patent to Denney. Further description of it will not be given here, and reference is made to said patent for the details of construction.

In the apparatus disclosed in the Denney application the clutches D and shaft S are adapted to rotate at the same rate of speed, so that as the tube is formed by the winding of the spiral strips P' and P² upon the core P there is no tendency to twist or distort the inner core. My improvement upon this portion of the apparatus consists in giving to the shaft S and the completed tube a different rate of rotation, and in order to accomplish this I provide the gear-wheels G⁶ and G⁷ with a different number of teeth, as shown in Fig. 7, where I have illustrated the gear-wheel G⁶ as having thirty-two (32) teeth, while the gear-wheel G⁷ has twenty-eight (28) teeth, so that while the shaft S', and consequently the shaft S, is making seven revolutions the tube driven by the clutches D will make eight revolutions, thereby giving to the inner core P in its completed form a twisted shape, as shown in Fig. 10. By this arrangement I am enabled to cause the edges of the interior core to always rest firmly against each other and to give to the core increased strength.

I will now disclose the second portion of my improvement, which is directed to the arrangement of the tube-cutting device in such a manner that it may be adjusted to cut the completed tube in short lengths at will. This particular feature of my invention is illustrated in Figs. 8 and 9 and its connected relation with the machine in Figs. 1 and 2.

Referring to Fig. 8, W' is a rod provided with a worm E at one end, adapted to move longitudinally through a corresponding nut N, secured to the frame of the machine, said rod being sustained at its other end in a bearing n, provided with a retractile spring K. t is a circular saw attached to a shaft carrying a pulley p', said shaft being carried in a tilting frame pivotally secured to the frame of the machine and adapted to slide in the direction of the feeding-clutches. D D are downwardly-projecting arms secured to the clutch mechanism and provided at their lower ends with pivoted dogs d and d', which are adapted when they move to the right to come into frictional contact with adjustable collars or stops g and g' on the sliding rod W'. The operation of this portion of the apparatus is as follows: The collars or stops g and g' are located at the desired points on the sliding rod W', and upon this location depends the length of the tubes to be cut. As the completed tube is made it is fed forward by the clutches alternately, so that when one of the dogs—say d—comes into contact with its adjustable collar g it forces the sliding rod W', supported on standards n, to the right, putting the spring K under stress and causing the rod to rotate by reason of the action of the screw E in the nut N. This rotary motion of the sliding rod W' causes the free end of a rigid pin o to be rotated into a groove in a block q, carried on the under side of a lever T', pivotally secured to the frame of the machine on a rod l, thereby imparting to the lever T' and to the frame T, and hence a saw t, a rotary motion in the direction of the traveling tube. The same act causes the pin o, by virtue of its bearing on the inner face of the groove in the block q, to impart a lateral or sliding motion to the lever T' and frame T on the pivot-rod l, at the same time placing the spiral spring K under stress, thereby causing the saw to travel laterally in the direction of motion of the completed tube at the same speed as the tube, so that as it is tilted forward under the action of the pin o it is caused to sever the tube and is prevented from buckling. On the return of this clutch, therefore, the rod W' is released and allowed to return to its normal position under the stress of the spring K, whereupon it is again immediately forced forward under the action of the second clutch and the dependent dog d' and the collar or stop g', and an additional length of tubing will be cut off in the same manner as before. It will thus be seen that each successive action of the clutches actuates the dogs d and d', respectively, and causes the rod W' to force the saw into operative relation with the tube as it is fed forward, thereby severing it automatically.

When it is desired to vary the length of the tubes to be cut, the adjustable collars or stops g and g' are adjusted to such positions as will give the required lengths.

Having thus described my invention, what I claim, and desire to secure by Letters Patent of the United States, is—

1. A tube-making machine having a former for giving to a strip of paper a tubular conformation, a rotary shaft carrying said former, clutch-feeding mechanism for feeding the tube forward continuously, said feeding mechanism being geared through worm gearing and shafting to the first-named shaft, the gearing between the first shaft and the shafting which carries the clutches having a different number of teeth, whereby the completed core and the clutches are caused to rotate at different speeds, thereby causing said core to assume a twisted form, substantially as described.

2. A tube-making machine provided with a rotary shaft carrying a reel of paper and a core-former over which the paper is drawn, feeding mechanism for successively and simultaneously drawing the core forward and twisting it, one or more additional strips of paper adapted to be wound about the core as it advances, and an automatic cutting device consisting of a saw geared to the same source of power which drives the aforesaid rotary shaft, said saw having adjustable mechanical connections with the feed mechanism, whereby it travels with the tube as it is fed forward and cuts it into short lengths, substantially as described.

3. A tube-making machine having mechanism for giving to a strip of paper a tubular conformation, mechanism for winding one or more strips of paper about this core, clutch-feeding mechanism for feeding the tube when completed continuously forward, and intermediate gear-wheels between the clutch-feeding mechanism and tube-forming mechanism, having a different number of teeth, whereby different rates of rotary speed are imparted to the core of the tube and to the completed tube, so as to give to the former a twisted or spiral shape, substantially as described.

4. A tube-making machine having clutching mechanism for feeding the completed tube continuously forward in the direction of its length, in combination with a severing-saw carried in close proximity to the tube but out of contact therewith, and means for causing said saw to automatically sever the tube after it has attained a given length, said means consisting of a sliding shaft provided with adjustable collars and mechanism for giving it rotary and longitudinal motion with a pin carried by the shaft and having mechanical connection with the saw-frame, whereby motion is imparted thereto simultaneously in two directions.

EDWIN T. GREENFIELD.

Witnesses:
CHAS. J. KINTNER,
A. V. HINEY.